(12) United States Patent
Butler

(10) Patent No.: US 8,186,386 B2
(45) Date of Patent: May 29, 2012

(54) MODULAR EXHAUST TUBE SYSTEM

(76) Inventor: Boyd L. Butler, Sandy, UT (US)

( * ) Notice: Subject to any disclaimer, the term of this patent is extended or adjusted under 35 U.S.C. 154(b) by 292 days.

(21) Appl. No.: 12/604,666

(22) Filed: Oct. 23, 2009

(65) Prior Publication Data

US 2011/0094615 A1 Apr. 28, 2011

(51) Int. Cl.
*F16L 9/18* (2006.01)

(52) U.S. Cl. ........ 138/115; 138/117; 138/107; 138/177; 180/309

(58) Field of Classification Search .......... 138/115–117, 138/177, 178, 109; 180/309
See application file for complete search history.

(56) References Cited

U.S. PATENT DOCUMENTS

| | | | | |
|---|---|---|---|---|
| 3,625,258 A * | 12/1971 | Phelps | ............................ | 138/115 |
| 4,114,715 A | 9/1978 | Theron | ............................ | 180/309 |
| 5,595,062 A | 1/1997 | Chabry | ............................ | 60/313 |
| 5,701,737 A | 12/1997 | Branik et al. | ............................ | 60/299 |
| 6,283,162 B1 | 9/2001 | Butler | ............................ | 8/177 |
| 6,360,782 B1 * | 3/2002 | Yoshitoshi et al. | ............................ | 138/115 |
| 6,460,248 B2 | 10/2002 | Butler | ............................ | 29/890.08 |
| 6,478,340 B1 | 11/2002 | Butler | ............................ | 285/131.1 |
| 6,575,198 B2 * | 6/2003 | Yoshitoshi et al. | ............................ | 138/115 |
| 6,742,332 B2 | 6/2004 | Piekarski | ............................ | 60/323 |

\* cited by examiner

*Primary Examiner* — Patrick F Brinson
(74) *Attorney, Agent, or Firm* — Thorpe North & Western LLP

(57) ABSTRACT

A modular exhaust tube system for directing exhaust gases from an internal combustion engine. The exhaust tube system includes first and second elongate half-shells, with each half-shell comprising an elongate thin-wall body having a substantially U-shaped cross-sectional profile with a constant sideways opening along the length of the body. The exhaust tube system also includes a center brace having dimensions which span the length and height of the sideways openings. The sideways openings of the first and second half-shells are coupled together around the center brace to form a flattened elongate exhaust tube having an inlet end and an outlet end for directing exhaust gases from the internal combustion engine. In one aspect the first and second half-shells are selected from a group of interchangeable and modular half-shells having different substantially U-shaped cross-sectional profiles that are reversible top-to-bottom and end-to-end.

24 Claims, 12 Drawing Sheets

MODULAR EXHAUST TUBE SYSTEM

FIELD OF THE INVENTION

The field of the invention is generally related to exhaust systems for automobiles, and more specifically to exhaust tube systems configured to increase the ground clearance on race cars used on oval tracks.

BACKGROUND OF THE INVENTION AND RELATED ART

Race cars used in automobile racing are typically constructed such that only a minimal amount of clearance is maintained between the underside of the car and the surface of the roadway or track. This is done to lower the center of gravity of the vehicle to improve vehicle handling and resistance to rolling over, and to minimize the drag on the car due to the air passing underneath. Such race cars typically have very stiff suspension systems which do not allow the vehicle to travel as great a distance up and down nor side-to-side as a standard production car, thus allowing for a reduced ground clearance. However, one of the challenges encountered in lowering the race car closer to the race track is providing sufficient clearance for the vehicle exhaust system, which is one of the lowest hanging components of a typical car, including race cars.

This problem is particularly acute on cars which race on oval race tracks, such as stock cars. The exhaust pipes of stock cars typically exit toward one or both sides of the car so as to minimize the length of the exhaust pipes and the resulting exhaust gas back pressure which lowers engine power output and overall engine performance. As such, the minimum ground clearance of the exhaust system often occurs where the exhaust pipes cross under the longitudinally-extending main frame members of the chassis at the sides of the vehicle. Stock cars typically race on oval tracks in a counter-clockwise rotational direction with centrifugal force causing the body and chassis of the car to lean toward the outside of the turn, or toward the right or passenger side of the car. Thus, the ground clearance on the right side of the car is usually less than the left side during cornering. Moreover, banked tracks can also induce high downward loads to the suspension system of stock cars requiring additional ground clearance.

SUMMARY OF THE INVENTION

As broadly described herein, a representative embodiment of the present invention includes a modular exhaust tube system for directing exhaust gases from an internal combustion engine. The exhaust tube system includes first and second elongate half-shells, with each half-shell comprising an elongate thin-wall body having a substantially U-shaped cross-sectional profile with a constant sideways opening along the length of the body. The exhaust tube system also includes a center brace having dimensions which span the length and height of the sideways openings. The sideways openings of the first and second half-shells are coupled together around the center brace to form an enclosed and flattened elongate exhaust tube having an inlet end and an outlet end for directing exhaust gases from the internal combustion engine. In one aspect the first and second half-shells are selected from a group of interchangeable and modular half-shells having different substantially U-shaped cross-sectional profiles that are reversible top-to-bottom and end-to-end.

As broadly described herein, another representative embodiment of the present invention resides in an exhaust tube system for directing exhaust gases from an internal combustion engine, and which includes first and second elongate half-shells, each half-shell comprising an elongate thin-wall body having a substantially U-shaped cross-sectional profile with a constant sideways opening along the length of the body, and with both a top edge and a bottom edge of the sideways opening being formed with an inwardly-bending lip. The exhaust tube system also includes a center brace having dimensions which span the length and height of the sideways openings. The sideways openings of the first and second half-shells are coupled together around the center brace to form an enclosed and flattened elongate exhaust tube having an inlet end and an outlet end for directing exhaust gases from an internal combustion engine, and with the inwardly-bending lips of the coupled half-shells joining together around the center brace to form a top groove and a bottom groove for containing weld melt from a linear weld.

The present invention also includes a method for making an exhaust tube system for an internal combustion engine, which method includes obtaining first and second elongate half-shells, with each half-shell comprising an elongate thin-wall body having a substantially U-shaped cross-sectional profile with a constant sideways opening along the length of the body. The method also includes obtaining a center brace having dimensions which span the length and height of the sideways openings. The method further includes aligning the sideways openings of the first and second half-shells together around the center brace, and coupling the half-shells and the center brace together to form an enclosed and flattened elongate exhaust tube having an inlet end and an outlet end for directing exhaust gases from an internal combustion engine.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which.

DETAILED DESCRIPTION OF EXEMPLARY EMBODIMENTS

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best be understood with reference to the accompanying drawings, wherein the elements and features of the embodiments are designated by numerals throughout.

Illustrated in FIGS. 1-12 are several representative embodiments of a modular exhaust tube system for directing exhaust gases from an internal combustion engine, which embodiments also include various methods for making or assembling an exhaust tube from the modular exhaust tube system components. As described herein, the modular exhaust tube system of the present invention provides several significant advantages and benefits over other types of exhaust systems. However, the recited advantages are not meant to be limiting in any way, as one skilled in the art will appreciate that other advantages may also be realized upon practicing the present invention.

Figure 1A:
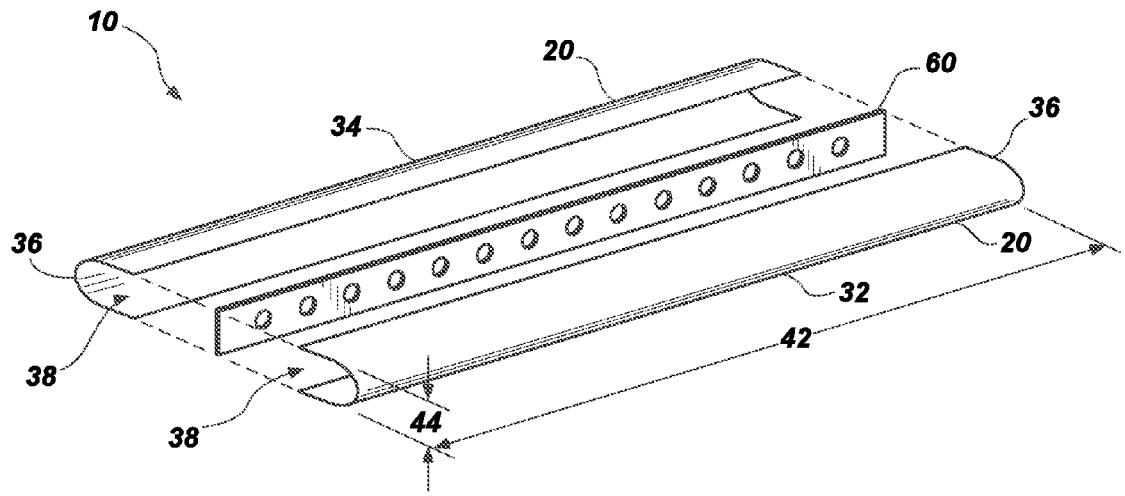
FIGS. 1A-1B together illustrate perspective exploded and assembled views of a modular exhaust piping system, in accordance with a representative embodiment of the present invention.
Figure 1B:
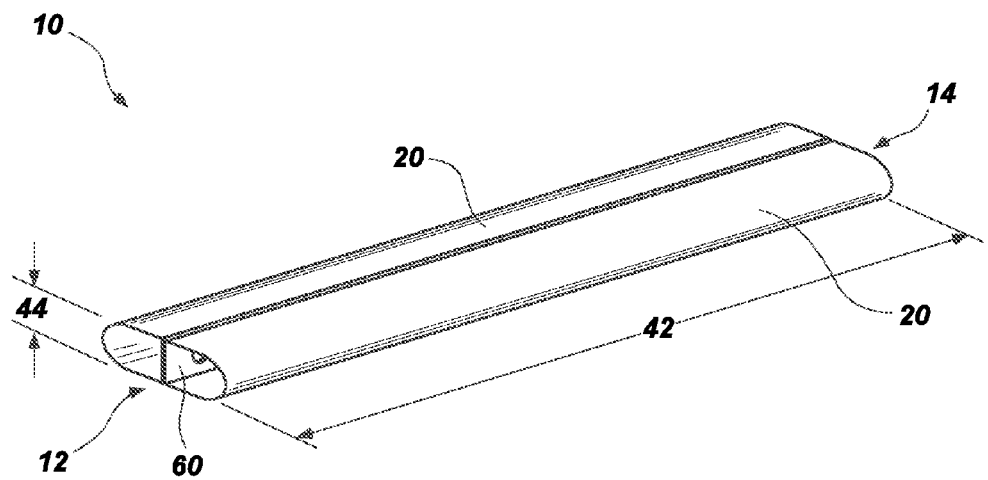
Figure 2A:
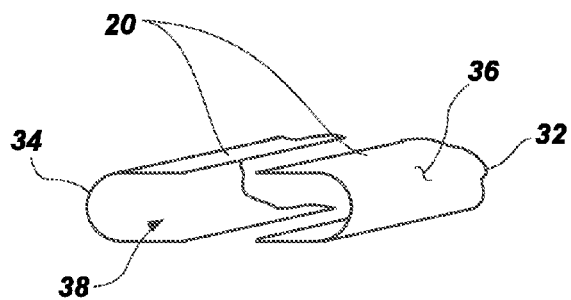
FIGS. 2A-2E together illustrate a group of modular elongate half shells, in accordance with a representative embodiment of the present invention.
Figure 2B:
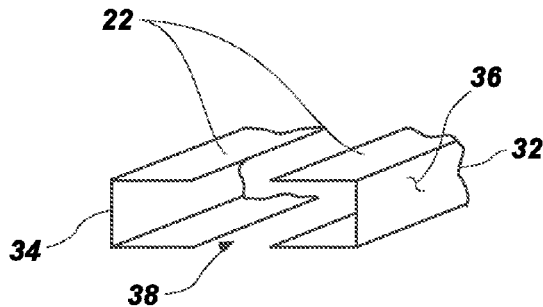
Figure 2C:
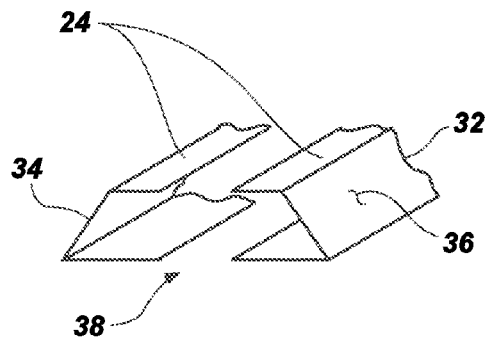
Figure 2D:
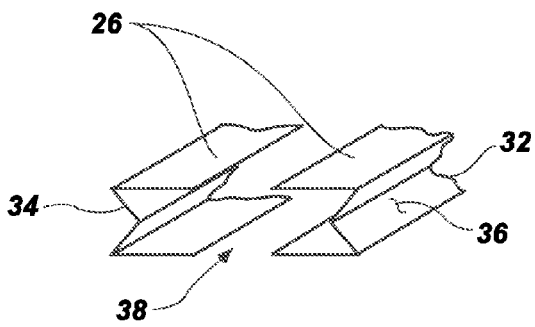
Figure 2E:
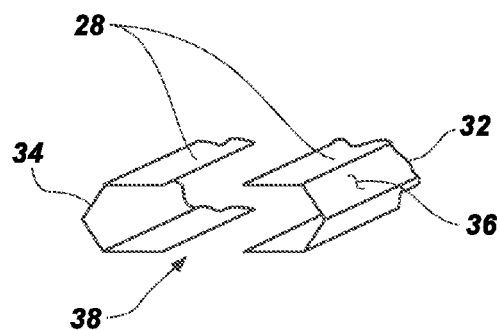
Figure 3A:
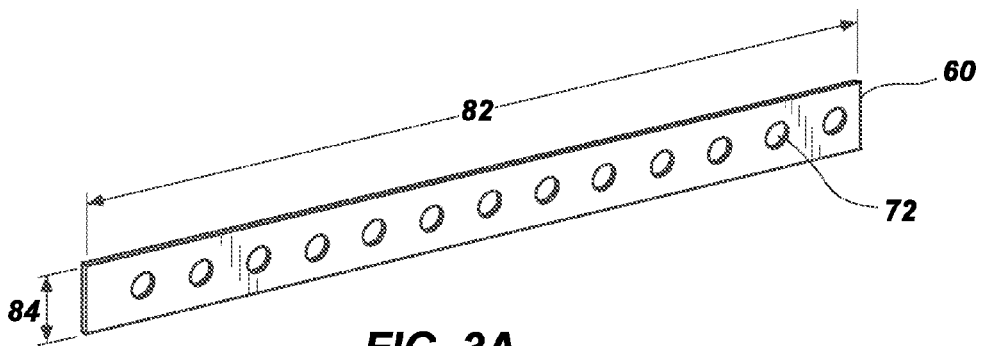
FIGS. 3A-3E together illustrate a group of modular center braces, in accordance with a representative embodiment of the present invention.
Figure 3B:
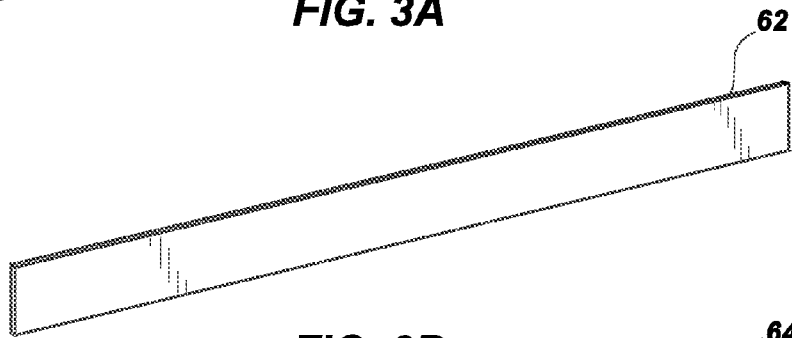
Figure 3C:
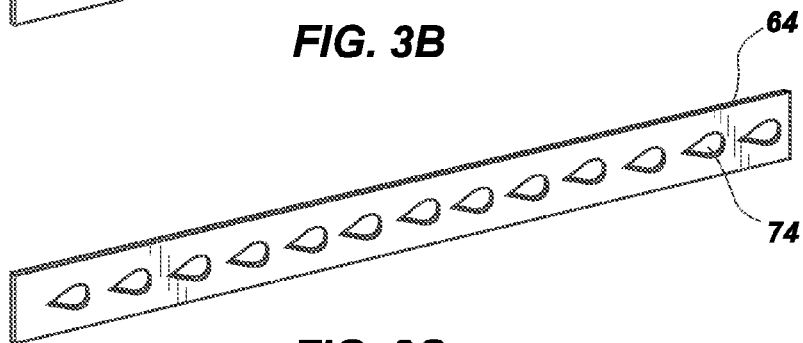
Figure 3D:
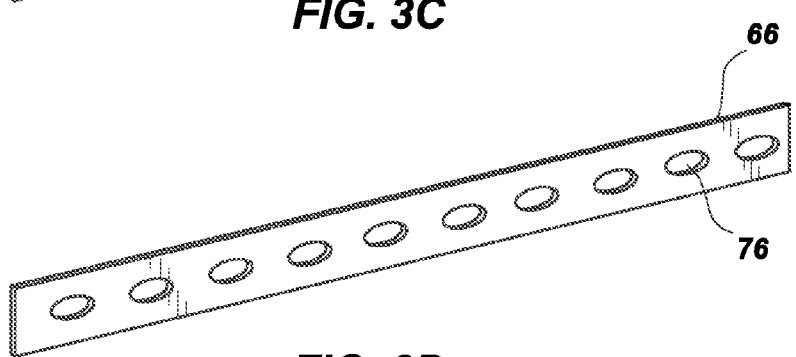
Figure 3E:
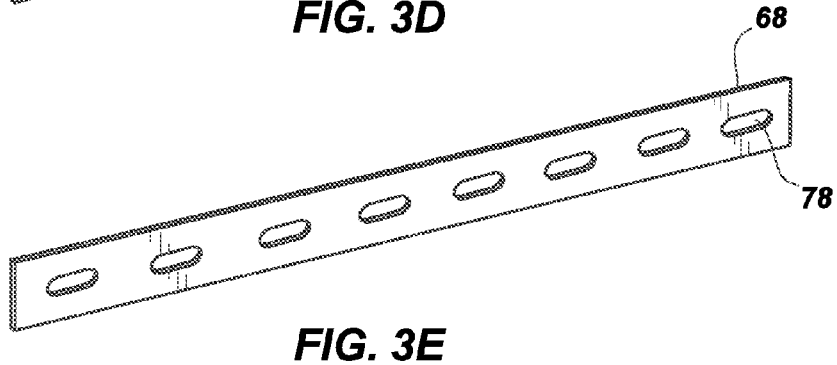

Illustrated in FIGS. 1A and 1B are perspective exploded and assembled views of a modular exhaust tube 10 in accordance with a representative embodiment of the present invention. The exhaust tube 10 includes first and second half-shells 20, and more specifically a first elongate half-shell 32 and a second elongate half-shell 34, with each half-shell further comprising an elongate thin-wall body 36 having a substantially U-shaped cross-sectional profile with a constant sideways opening 38 along the length of the body. The assembled exhaust tube 10 also includes a center brace 60 having dimensions which span the length 42 and height 44 of the sideways openings. The respective sideways openings 38 of the first and second half-shells 20 are similarly shaped and sized to mate and be coupled together around the center brace 60 to form a flattened elongate exhaust tube 10 having an inlet end 12 and an outlet end 14 for directing exhaust gases from an internal combustion engine. In one aspect of the invention both of the first and second half-shells and the center brace can be made from a mild carbon steel, such as ASTM 1008 or ASTM 1018 steel, etc., that is suitable for most machining operations such as bending, punching, welding, and grinding, etc. The raw metal stock for the various components can come in sheets having a thickness between 1/16 inch and 1/8 inch, with a nominal thickness of about 3/32 inch.

Figure 10A:
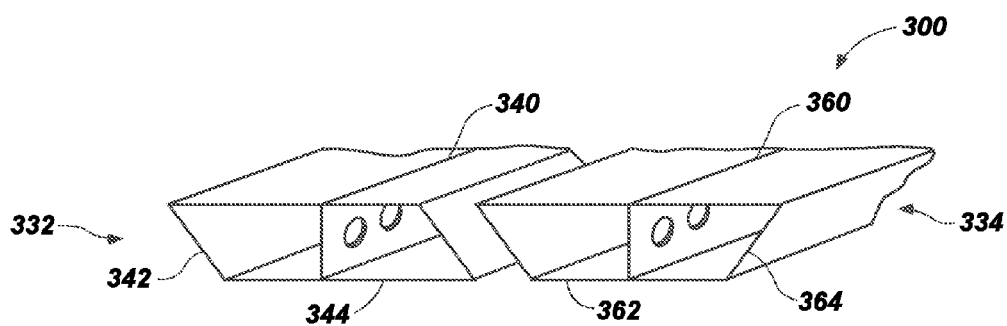
FIGS. 10A-10E together illustrate an exhaust system having a pair of modular exhaust tubes orientated as a tandem pair, in accordance with another representative embodiment of the present invention.
Figure 10B:
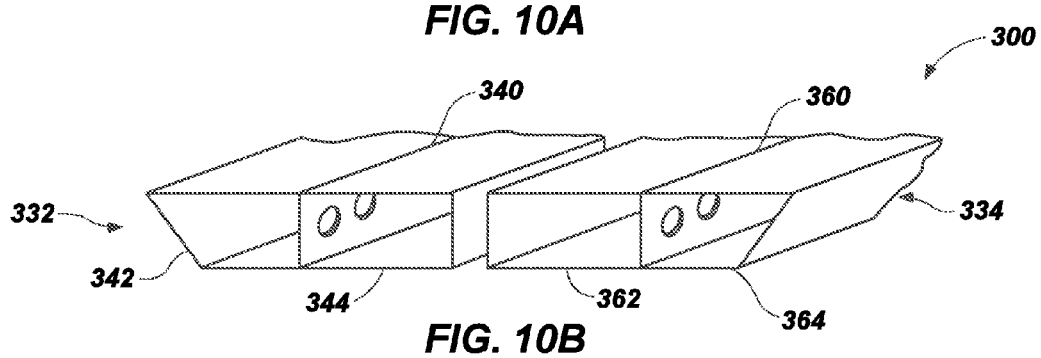
Figure 10C:
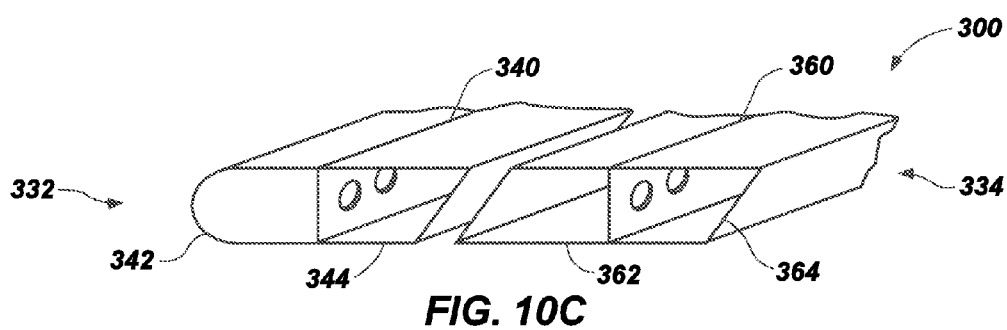
Figure 10D:
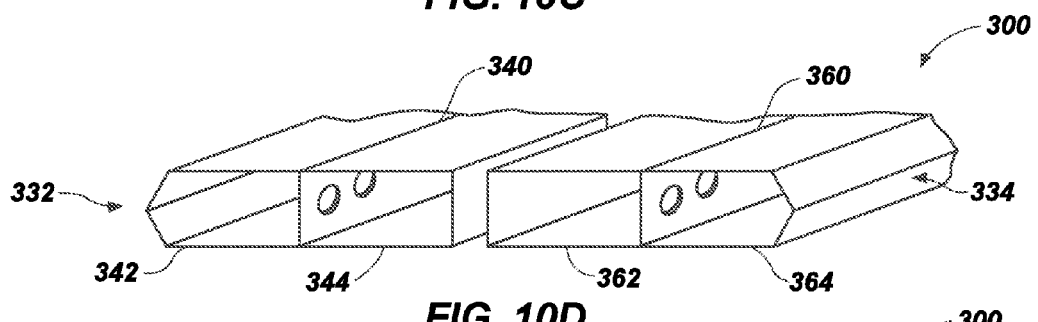
Figure 10E:
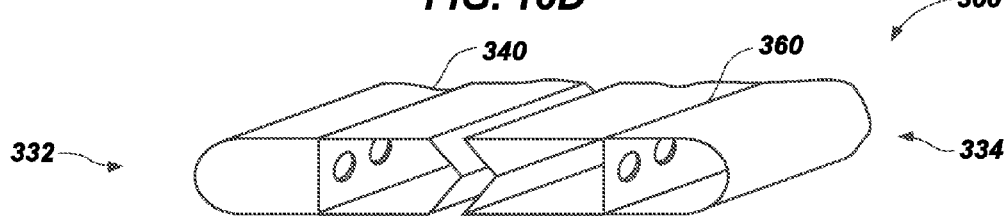

As shown in FIGS. 2A-2E, the first 32 and second 34 elongate half-shells of the modular exhaust tube system can be selected from a group of interchangeable and modular half-shells having elongate thin-wall bodies 36 with different substantially U-shaped cross-sectional profiles. For instance, the two "curved" half-shells 20 illustrated in FIG. 2A can each have a substantially similar U-shaped cross-sectional profile that is shaped much like a sideways "U", with a smoothly curved and rounded side and an open opposite side forming the sideways opening 38 along the length of the body. Alternatively, the two "rectangle" half-shells 22 illustrated in FIG. 2B can have a substantially U-shaped cross-sectional profile that is more rectangular with a squared-off side having sharp 90 degree corners. The substantially U-shaped cross-sectional profile of the two "trapezoid" half-shells 24 illustrated in FIG. 2C can have a trapezoid-shaped profile with one of the top and bottom pieces being wider than the other and with an angled side. Furthermore, the two "sigma" half-shells 26 illustrated in FIG. 2D can have a sigma-shaped profile to form a side having an inwardly-directed peak, while the two "peaked" half-shells 28 illustrated in FIG. 2E can have a peak-shaped profile to form a side having an outwardly-directed peak. As will be described in more detail below, and as shown in FIG. 10E, the angles of the inwardly-directed peak of the sigma half-shells 26 can match the angles of the outwardly-directed peak of the peak half-shells 28, so that the sides of the two half-shells can be positioned substantially adjacent to each other to form an angled gap with constant spacing between the sides.

It is to be appreciated that other complimentary shapes for the substantially U-shaped cross-sectional profiles of the elongate half shells, as may be contemplated by one of skill in the art but not specifically illustrated herein, are also considered to fall within the scope of the present invention.

As illustrated in FIGS. 3A-3E, the center brace of the modular exhaust tube system can also be selected from a group of interchangeable and modular center braces having various aperture configurations along the length 82 thereof. For instance, the center brace 60 illustrated in FIG. 3A can have a plurality of round apertures 72 formed along its length for allowing the exhaust gases to pass from one side to the other after assembly with two half-shells into the flattened elongate exhaust tube 10, as shown in FIG. 1B. Alternatively, the center brace 62 shown in FIG. 3B can be solid along the length thereof to restrict the exhaust gases from passing from one side to the other in the enclosed exhaust tube. The center brace 64 shown in FIG. 3C can have NACA duct-shaped apertures 74 formed along a length thereof. A NACA duct aperture is a generally triangular opening have its apex pointed against the direction of flow and with curved sides configured to create opposing vortexes which help to direct the flow through the aperture. Additionally, center brace 66 shown in FIG. 3D can have oblong or elliptical apertures 76 with the long axis of the apertures aligned with the length of the exhaust tube, while center brace 68 shown in FIG. 3E can have rounded slot-shaped apertures 78, or rectangular slots with rounded ends, also with the long axis of the slots aligned with the length of the exhaust tube.

It is to be understood that the shapes of the apertures formed through the center braces illustrated in FIGS. 3A and 3C-3E serve to illustrate a few representative embodiments of the center braces, and that other aperture shapes, such as triangular and polygonal shapes, etc., are also possible and can be considered to fall within the scope of the present invention.

Figure 4A:
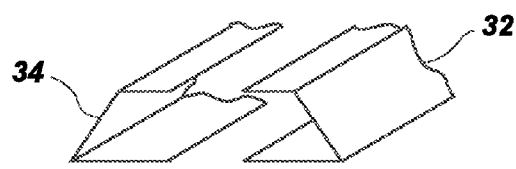
FIGS. 4A-4D together illustrate the reversibility of two identical modular elongate half shells from the group of FIGS. 2A-2E.
Figure 4B:
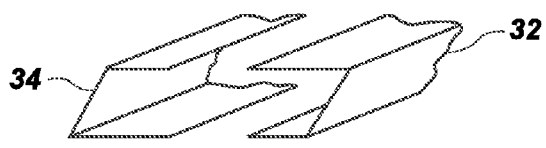
Figure 4C:
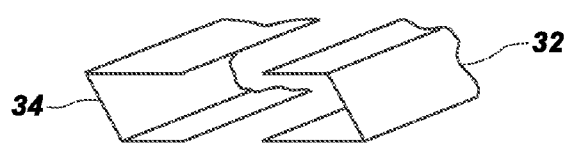
Figure 4D:
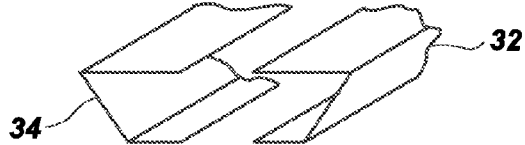

In another representative embodiment of the modular exhaust tube system, any of the half-shells illustrated in FIGS. 2A-2E can be reversible top-to-bottom. For instance, either of the first 32 or second 34 trapezoidal half-shells 24 of FIG. 2C can be reversed top-to-bottom, as shown in FIGS. 4A-4C. In FIG. 4A, for example, the first 32 and second 34 half-shells are in the same orientation as in FIG. 2C, with the short segment on top and the longer segment on the bottom. In FIG. 4B, first half-shell 32 has been reversed top-to-bottom so that the longer segment is on the top and the shorter segment is on the bottom, while the second half-shell 34 remains in the same orientation as shown in FIG. 4A. Likewise, in FIG. 4C the first half-shell 32 can remain fixed in the orientation shown in FIG. 4A while the second half-shell 34 can be reversed. And as shown in FIG. 4C, both the first 32 and second 34 half-shells can be reversed top-to-bottom. It is to be appreciated that each of the other half-shell shapes shown in FIGS. 2A, 2B, 2D, and 2E can also be reversible top-to-bottom in a similar fashion.

Figure 5A:
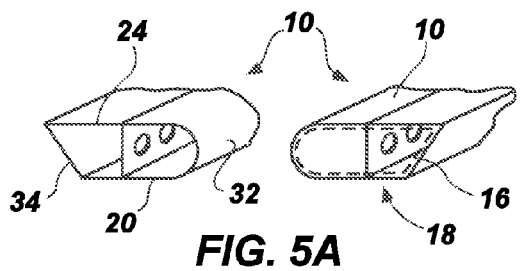
FIGS. 5A-5J together illustrate the interchangeability within the group of modular elongate half shells from the group of FIGS. 2A-2E.
Figure 5B:
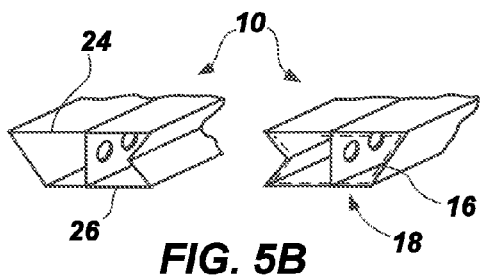
Figure 5C:
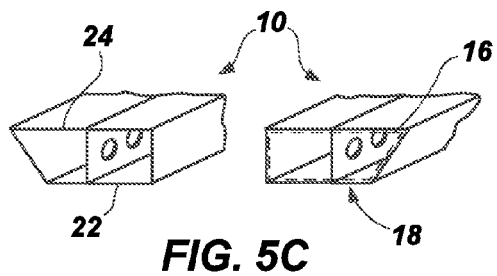
Figure 5D:
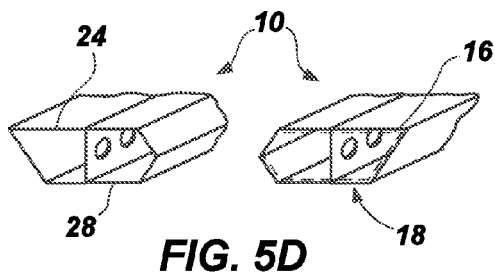
Figure 5E:
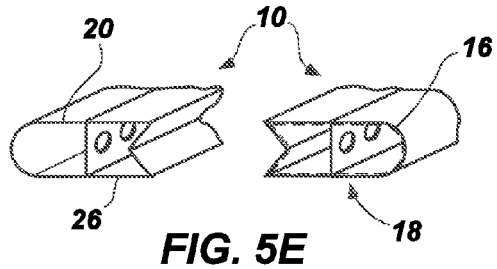
Figure 5F:
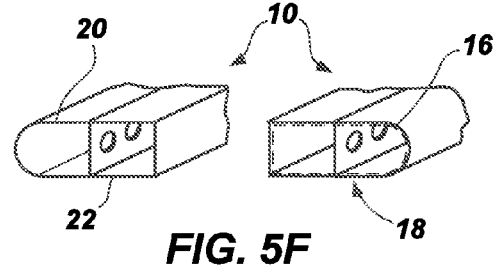
Figure 5G:
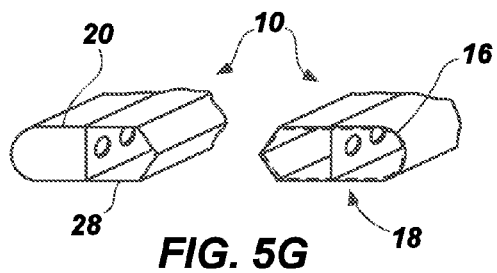
Figure 5H:
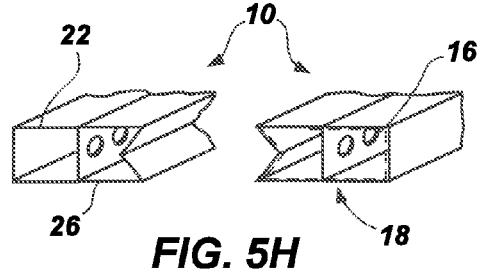
Figure 5I:
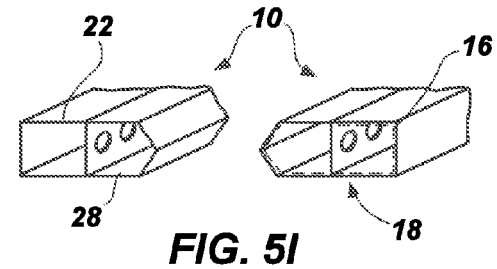
Figure 5J:
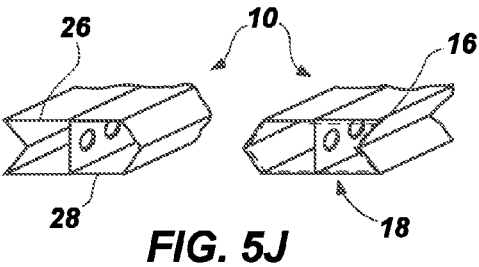

Each of the different half-shells illustrated in FIGS. 2A-2E can be configured with a similarly shaped and sized sideways opening 38 along the length thereof, so that any two half-shells selected from the group of half-shells having a different substantially U-shaped profile can be mixed and matched together to form the flattened elongate exhaust tube 10. Thus, illustrated in FIGS. 5A-5J are various permutations of the assembled elongate exhaust tube 10 which can be constructed using the differently-shaped half-shells of the modular exhaust tube system described above. It is to be appreciated that each half-shell can also be reversible end-to-end, so that a half-shell of any shape can occupy either of the arbitrary first 32 or second 34 half-shell positions. Thus, illustrated in FIG. 5A are the principle and reversed combinations of a trapezoid half-shell joined to a curved half-shell. In FIG. 5B are shown the principle and reversed combinations of a trapezoid half-shell joined to a sigma half-shell. In FIG. 5C are shown the principle and reversed combinations of a trapezoid half-shell joined to a rectangle half-shell. In FIG. 5D are shown the principle and reversed combinations of a trapezoidal half-shell joined to a peaked half-shell. In FIG. 5E are shown the principle and reversed combinations of a curved half-shell joined to a sigma half-shell. In FIG. 5F are shown the principle and reversed combinations of a curved half-shell joined to a rectangle half-shell. In FIG. 5G are shown the principle and reversed combinations of a curved half-shell joined to a peaked half-shell. In FIG. 5H are shown the principle and reversed combinations of a rectangle half-shell and a sigma half-shell. In FIG. 5I are shown the principle and reversed combinations of a rectangle half-shell joined to a peaked half-shell. And in FIG. 5J are shown the principle and reversed combinations of a sigma half-shell joined to a peaked half-shell.

Again, it is to be appreciated that other complimentary shapes for the substantially U-shaped elongate half shells not illustrated herein can nevertheless be considered to fall within the scope of the present invention.

Each of the elongate half-shells 32, 34 having a substantially U-shaped cross-sectional profile with a constant sideways opening along the length of the thin-wall body can be formed by bending or folding the identically-sized piece of sheet steel into the various different shapes. Therefore, despite the differences in the shapes of their enclosed ends and cross-sectional areas, each of the differently-shaped half-shells can have the same pre-determined circumference. Thus, as further shown in FIGS. 5A-5J, any two of the differently-shaped half-shells can be joined together around a center brace to form a flattened elongate exhaust tube 10 having a constant and pre-determined circumference 16 which encloses a constant internal cross-sectional area 18 along the length therefore. As racing standards on a particular circuit may restrict all exhaust pipes to a maximum pre-determined circumference or less, this feature can be advantageous since the shape of the modular exhaust tube can be changed or modified through selection of the various differently-shaped half-shells without changing the circumference of the exhaust tube.

Figure 6A:
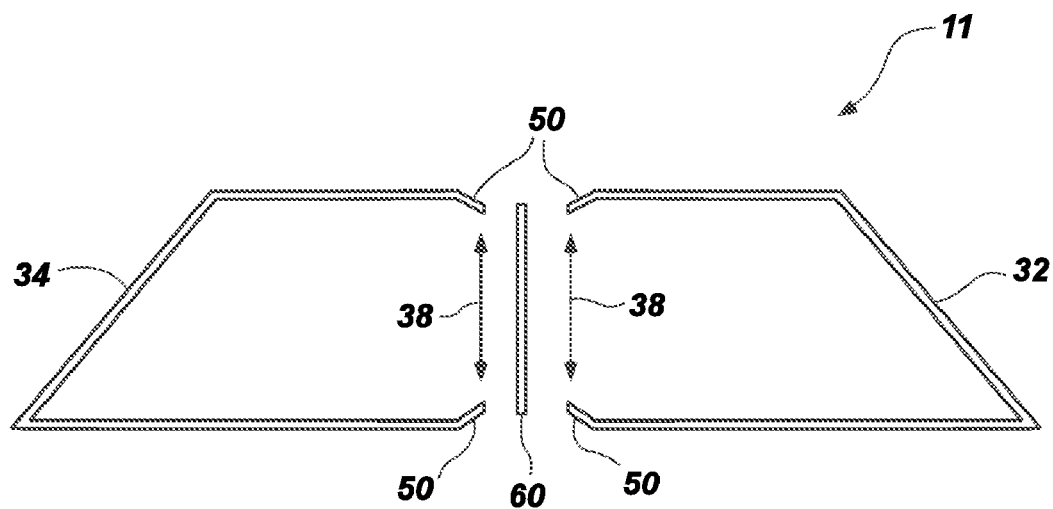
FIGS. 6A and 6B together illustrate the inwardly-bending lips of coupled half-shells joined together to form grooves for containing weld melt, in accordance with a representative embodiment of the present invention.
Figure 6B:
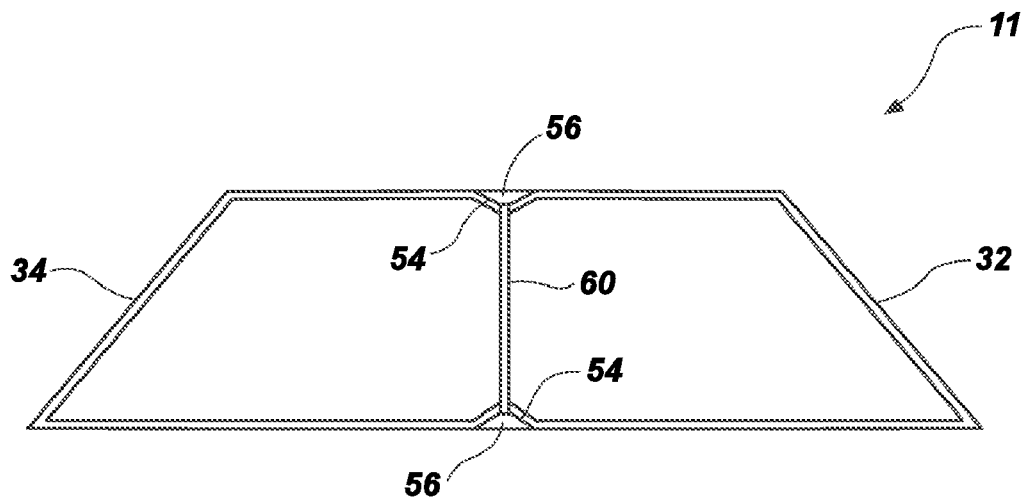

Illustrated in FIGS. 6A and 6B is another representative embodiment 11 of the modular exhaust tube system in which each of the sideways openings 38 of elongate half shells 32, 34 can have at least one inwardly-bending lip 50 (FIG. 6A), and wherein the inwardly-bending lips of the coupled half-shells can join together around the center brace 60 to form a groove 54 for containing weld melt 56 from a linear weld (FIG. 6B). Having a groove for containing the weld melt from a linear weld can be advantageous over the prior art, since the welded and fused material from the three intersecting pieces (the lip from each half-shell and the edge of the center brace) can merge together into a homogenous joint that is stronger and more stress-resistant than the spot-welded or linear-welded joints used in the prior art to join two intersecting plates or abutting plates. Moreover, having a groove formed by two inwardly bending lips 50 allows more of the weld melt 56 to remain as part of the joint of the assembled exhaust tube after removal of any excess weld melt projecting above the surface of the exhaust tube during a finish grinding stage. This can result in a larger joint that is more capable of resisting the stress and corrosive forces found in a heated exhaust gas environment.

In accordance with another representative embodiment, FIGS. 7A-9B illustrate exploded and assembled views of a modular exhaust tube system 100 that can include a modular transition tube 150 or transition section coupled to the inlet end 112 of a modular exhaust tube 110. The transition tube can operate to connect the secondary exhaust piping of the internal combustion engine to the flattened profile of the elongate exhaust tube, and to smoothly transition the round or oval shape of the exhaust outlet of the secondary exhaust piping to the different substantially U-shaped cross-sectional profiles of the various interchangeable and modular half-shells 120.

Figure 7A:
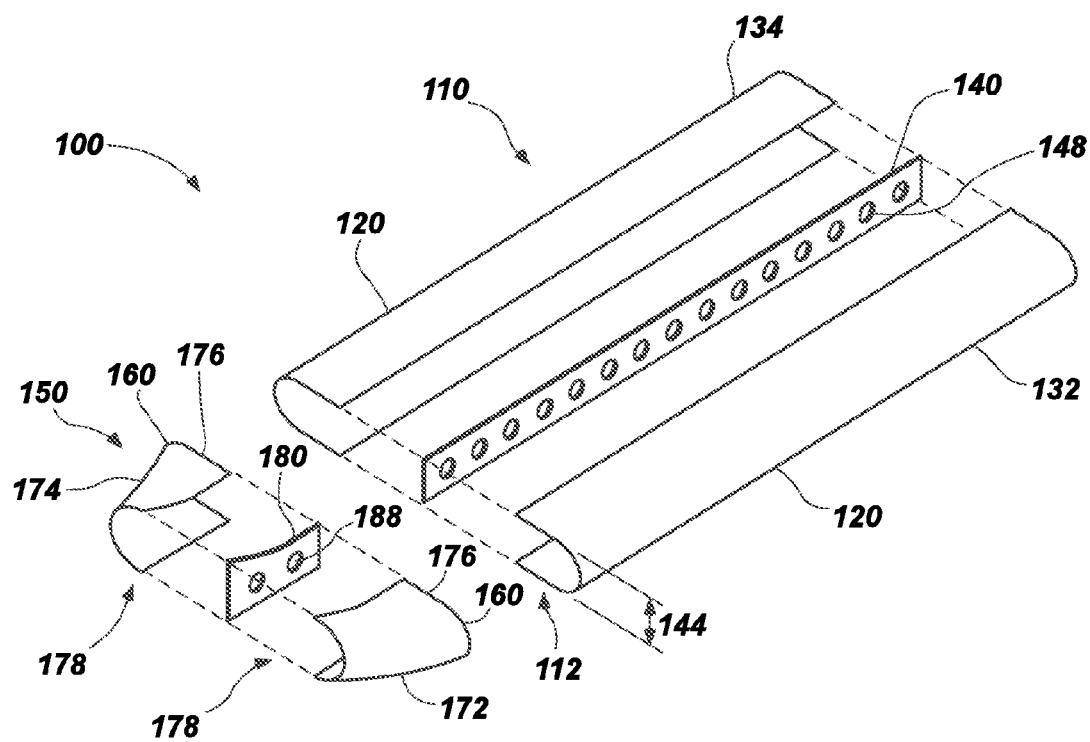
FIGS. 7A and 7B together illustrate perspective exploded and assembled views of a modular exhaust tube system, in accordance with another representative embodiment of the present invention.
Figure 7B:
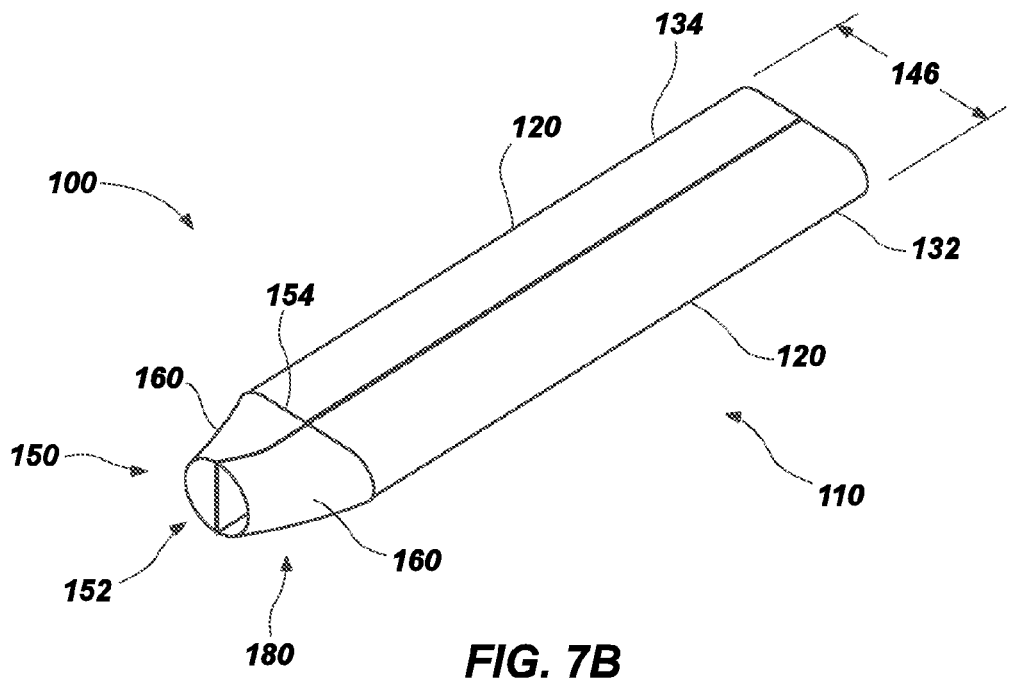
Figure 8A:
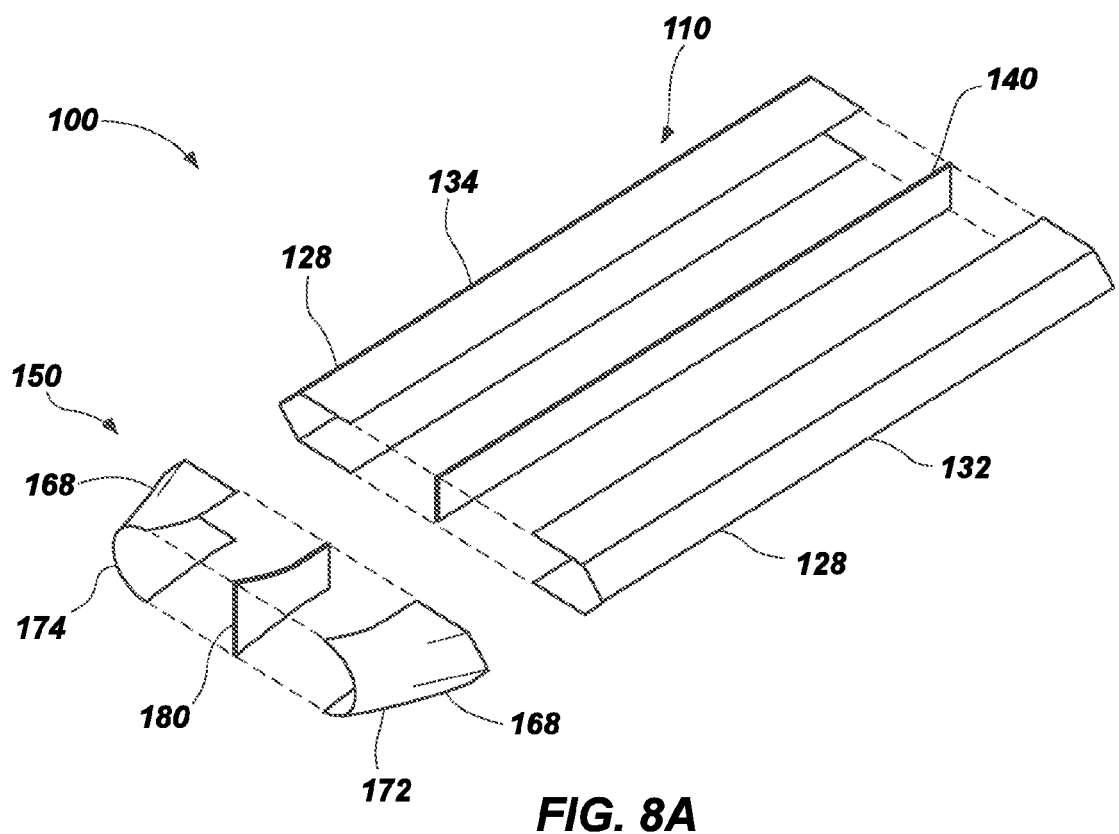
FIGS. 8A and 8B together illustrate perspective exploded and assembled views of a modular exhaust tube system, in accordance with yet another representative embodiment of the present invention.
Figure 8B:
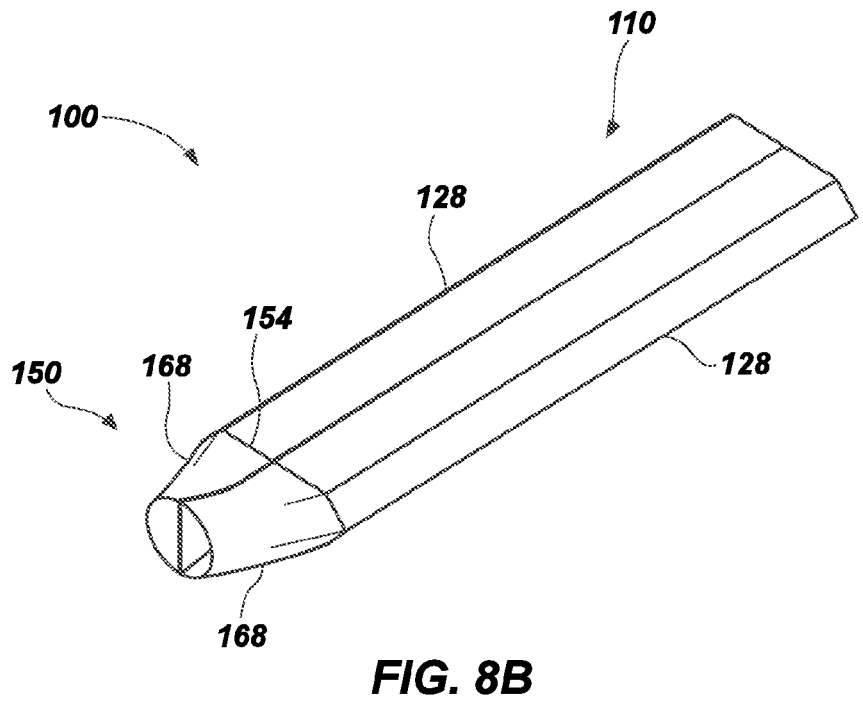

As shown in FIGS. 7A and 7B, the transition tube 150 can include first 172 and second 174 tapered half-shells 160, with each tapered half-shell comprising a tapered thin-wall body 176 also having a substantially U-shaped cross-sectional profile, and with a tapered sideways 178 opening along the length of the body. The tapered half-shells can be sloped inward in the vertical plane and outward in the horizontal plane to accommodate the reduced height 144 and the increased width 146 of the exhaust tube 110, in relation to the height and width of a more symmetrically-rounded secondary exhaust piping outlet. The transition tube 150 can also include a center brace 180 having dimensions which span the length 192 and tapering height 194 of the tapered sideways openings 178.

Figure 9A:
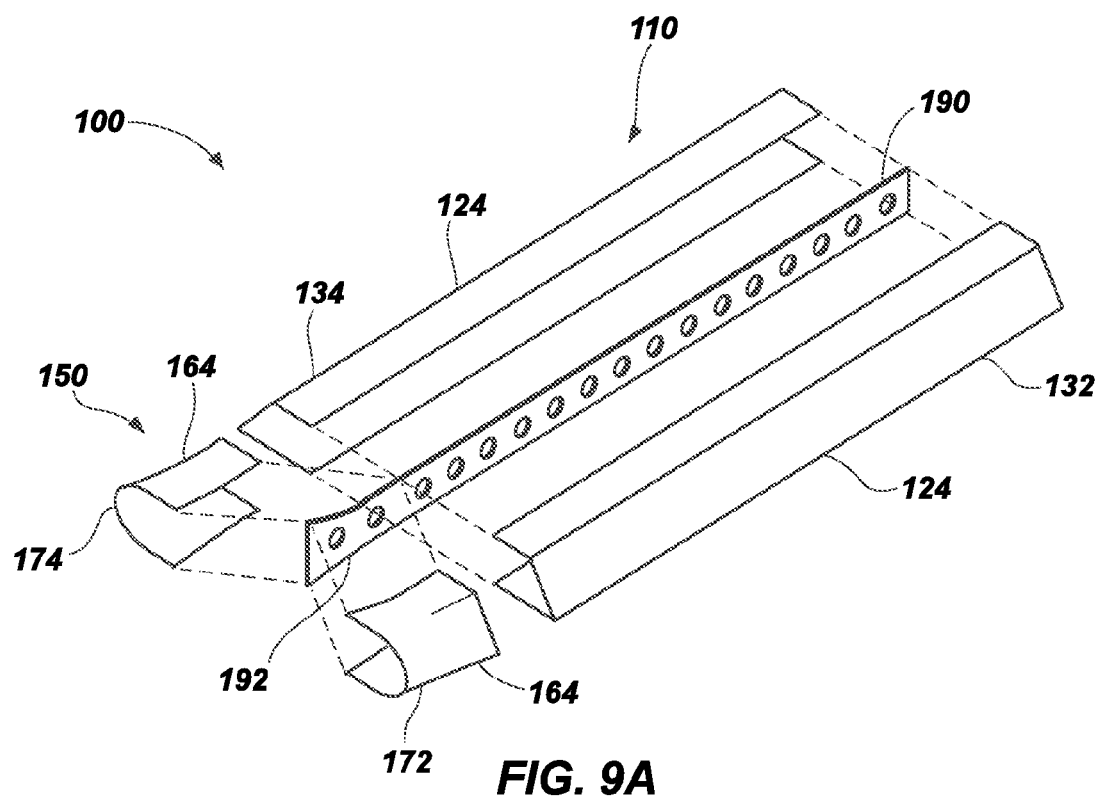
FIGS. 9A and 9B together illustrate perspective exploded and assembled views of a modular exhaust tube system, in accordance with yet another representative embodiment of the present invention.
Figure 9B:
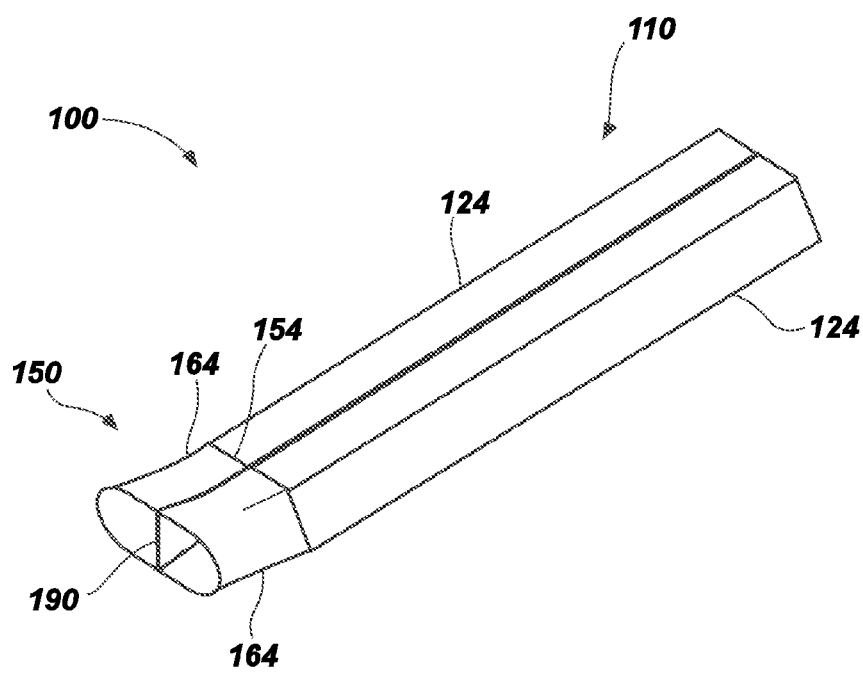

In a manner similar to the assembly of the exhaust tube 110 itself, the tapered sideways openings 178 of the first and second tapered half-shells 160 can be coupled together around the center brace 180 to form an enclosed transition tube 150 having a transition inlet 152 shaped to match the rounded discharge piping and a transition outlet 154 shaped to match the inlet end 112 of the elongate exhaust tube, as shown in FIG. 7B. The first and second tapered half-shells 160 can be assembled together to form a transition tube with a transition outlet 154 that matches the shape of the assembled curved half-shells 120. In contrast, the first and second tapered half-shells 168 of FIGS. 8A and 8B can be assembled together form a transition tube 150 with a transition outlet 154 that matches the shape of the assembled peaked half-shells 128 of the exhaust tube 110. And as shown in FIGS. 9A and 9B, the first and second tapered half-shells 164 of FIGS. 8A and 8B can be assembled together form a transition tube 150 with a transition outlet 154 that matches the shape of the assembled trapezoid half-shells 124 of the exhaust tube 110.

Therefore, it is understood that any of the tapered half-shells 172, 174 that can be assembled into the transition tube 150 can be formed to match any of the different substantially U-shaped half-shells 132, 134 of the exhaust tube 110, and can thus be configured to match any of the cross-sectional profiles of the exhaust tube illustrated in FIGS. 5A-5I. Furthermore, it is also to be understood that each of the tapered sideways openings can also have one or more inwardly-bending lips, as shown in FIGS. 6A-6B, and that the inwardly-bending lips of the coupled tapered half-shells can also join together around the tapered center brace of the transition tube 150 to form a groove that contains the weld melt from a linear weld.

Referring back to FIGS. 7A and 8A, the tapered center brace 180 of the transition section 150 can be separate from the center brace 140 of the elongate exhaust tube 100, and can include apertures 188 which may or may not correspond with apertures 148 included in the center brace of the elongate exhaust tube 110. In another aspect of the present invention illustrated in FIG. 9A, however, the center brace 190 of the elongate exhaust tube 110 can comprise an extension 192 that serves as the center brace for the transition tube 150. One advantage of the embodiment of FIGS. 9A and 9B is that both the elongate half-shells 132, 134 of the exhaust tube 110 and the tapered half shells 172, 174 of the transition tube can be coupled together around the same center brace 190 to form an enclosed and flattened elongate exhaust tube 110 with a pre-assembled tapered transition section 150 having a common brace or "backbone". The resulting exhaust tube system with a unitary center brace can provide additional rigidity and strength over embodiments in which all components are assembled separately, while at the same time being fully customizable to accommodate the various combinations of the elongate 124 and tapered 164 half-shells described above.

It can be seen in FIG. 7A that the tapered center brace 180 can be asymmetrical with an inwardly tapered top edge and a straight bottom edge. This can be advantageous when accommodating secondary exhaust piping from the internal combustion engine which has been configured to maximize the ground clearance underneath the vehicle so that the bottom surface of the elongate exhaust tube remains the lowest point on the vehicle. In another aspect of the present invention illustrated in FIGS. 8A and 9A, however, the tapered center brace 180, 192 can be symmetrical with both the top and bottom edges forced with an inward taper. This alternative configuration can be useful when accommodating a secondary exhaust piping outlet that for one reason or another extends below the bottom of the elongate exhaust tube.

Figure 11A:
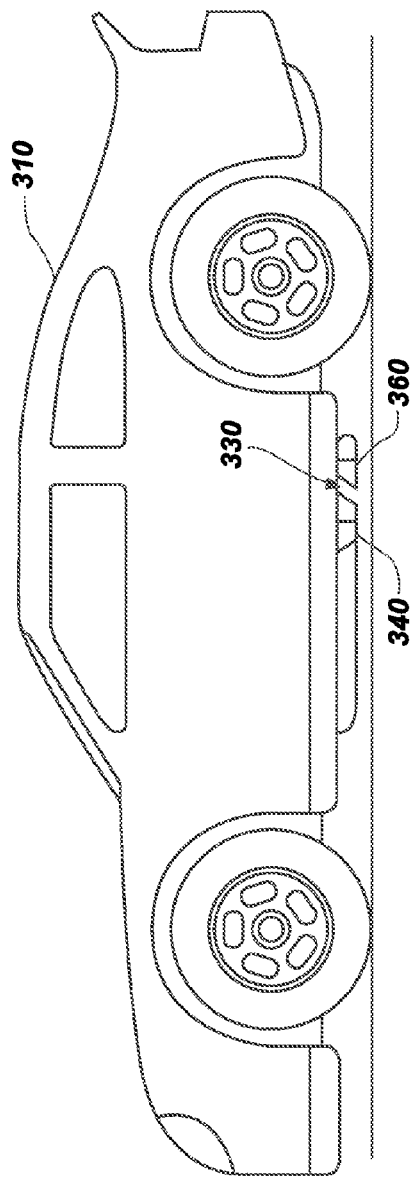
FIGS. 11A-11B together illustrate side and bottom views of a racing car having a tandem pair of modular exhaust tubes, in accordance with a representative embodiment of the present invention.
Figure 11B:
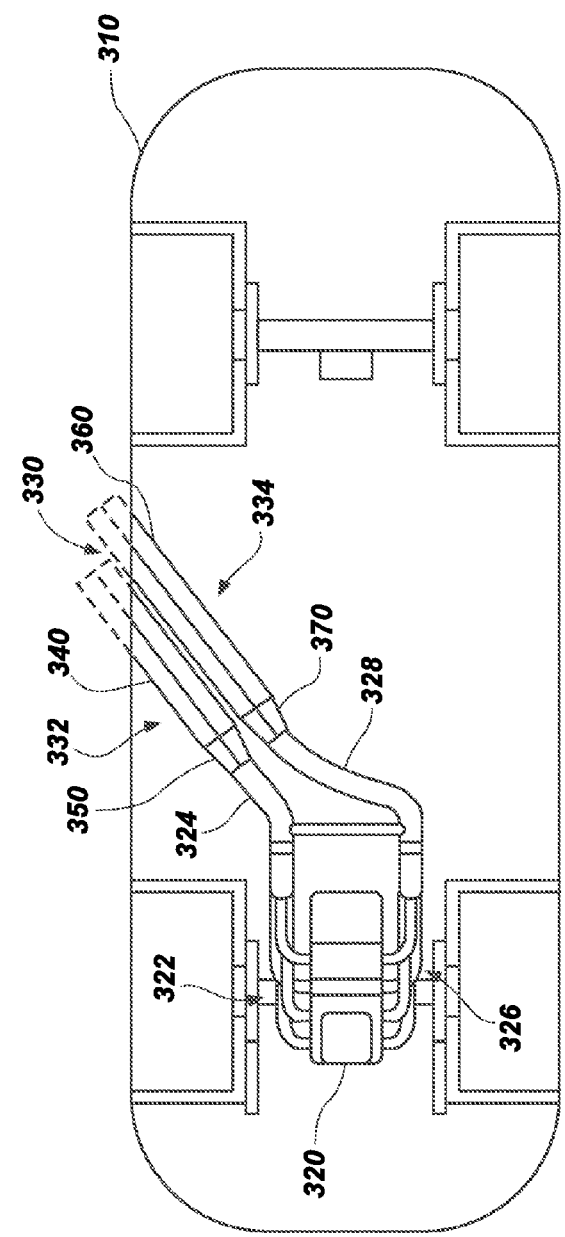
Figure 12A:
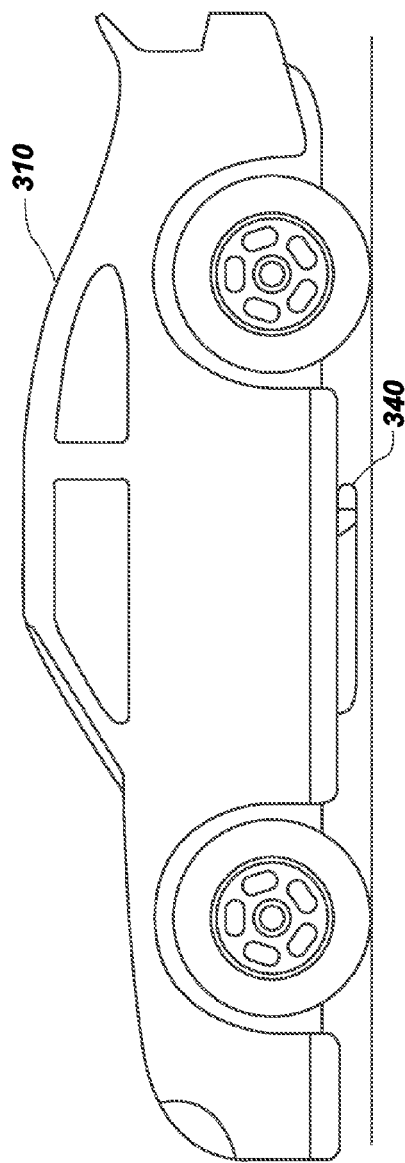
FIGS. 12A-12B together illustrate side and bottom views of a racing car having a separated pair of modular exhaust tubes, in accordance with a representative embodiment of the present invention.
Figure 12B:
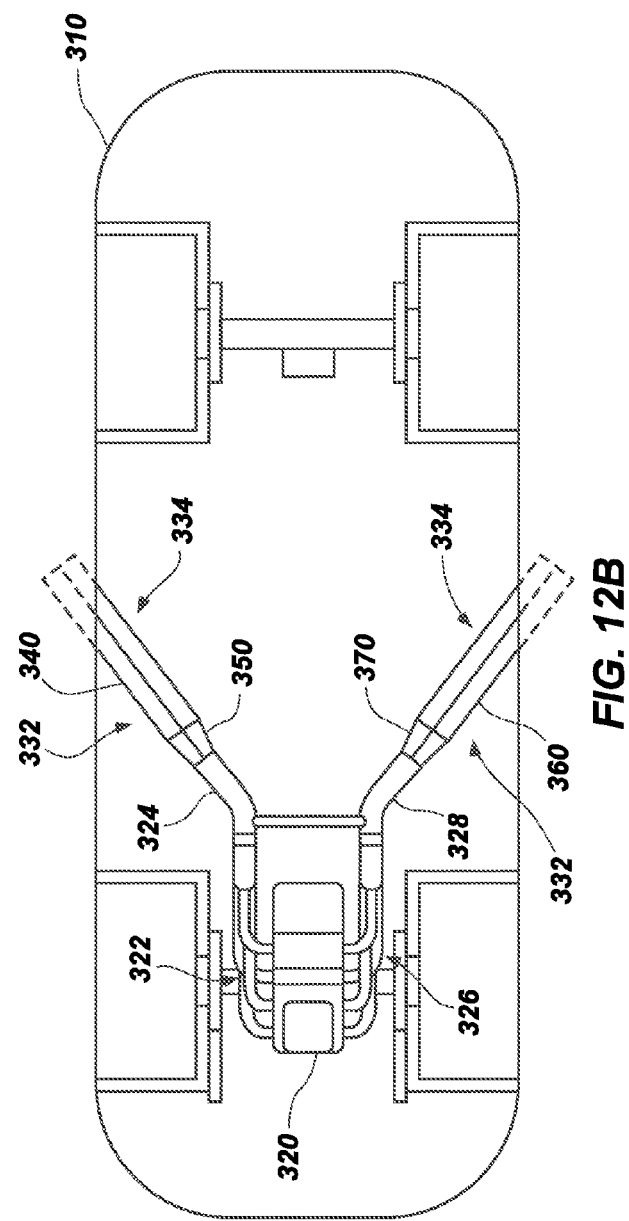

Illustrated in FIGS. 10A-10E and FIGS. 11A-11B are various representative embodiments of a modular exhaust tube system 300 that can include a tandem flattened elongate exhaust tube 360 positioned adjacent to but without contacting the first exhaust tube 340, for directing additional exhaust gases from the internal combustion engine. As can be seen in FIGS. 11A and 11B, in some vehicle exhaust system it may be desirable to direct the exhaust gases from both sides of the engine 320 to the same side of the vehicle 310 that is opposite the fuel inlet location, so as to reduce the risk of accidental fire in the case of a fuel spill. Thus, both exhaust headers 322, 326 can connect with secondary exhaust system piping 324, 228 having the standard, more rounded cross-sectional piping profiles. In turn, the outlet from the secondary exhaust piping 324, 328 can be coupled to transition tubes 350, 370 that can direct the hot exhaust gases into the tandem elongate exhaust tubes 340, 360 for discharge out the side of the vehicle. As the elongate exhaust tubes 340, 360 can be provided with longer lengths required of most vehicle, each exhaust tube can be trimmed to length after installation on the vehicle.

In certain instances racing standards on a particular circuit may require that the exhaust system for each exhaust header be constructed and maintained separately, and with a uniform gap 330 between any two elongate exhaust tubes 340, 360 directing exhaust gases to the same side of the racing vehicle. However, it may also desirable for the owner/operator of the racing vehicle to keep the uniform gap as narrow as possible to conserve space under the vehicle and limit aerodynamic drag, as two narrow bodies can usually generate more drag than one wide body. Therefore, as shown in FIGS. 10A-10E, the half-shells 342, 344, 362, 264 of the first 340 and second 360 elongate exhaust tubes can be selected to have complementary sides for the elongate half-shells 344, 362 that are adjacent to each other. As can be seen, the complementary exposed sides can include complementary trapezoid half-shells (FIGS. 10A and 10C), complementary rectangle half-shells (FIGS. 10B and 10D), and complementary sigma-peaked half-shells (FIG. 10E).

Also illustrated in FIGS. 10A-10E is the advantage provided by the modular exhaust tube system 300 of the present invention that allows the leading side surface 332 and/or trailing side surfaces 334 of the elongate exhaust tubes 340, 360 to be modified or adjusted by the owner/operator of the vehicle to affect the aerodynamics of the air flow under the racing vehicle. Whereas the aerodynamic design of the leading and trailing sides of the prior art exhaust systems is either limited to the stock designs or is prohibitively difficult and expensive to modify, the leading 332 and trailing 334 surfaces of the elongate exhaust tubes can be easily and inexpensively adjusted in accordance with a user's particular preference. Furthermore, this benefit can apply to both the adjacent-exhaust tube configuration illustrated in FIGS. 11A-11B, as well as to the separated-exhaust tube configuration shown in FIGS. 12A-12B in which the exhaust gases from opposite sides of the engine 320 are directed to the same opposite sides of the vehicle 310.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, any steps recited in any method or process claims, furthermore, may be executed in any order and are not limited to the order presented in the claims. The term "preferably" is also non-exclusive where it is intended to mean "preferably, but not limited to." Accordingly, the scope of the invention should be determined solely by the appended claims and their legal equivalents, rather than by the descriptions and examples given above.

What is claimed and desired to be secured by Letters Patent is:

1. A modular exhaust tube system for directing exhaust gases from an internal combustion engine, comprising:
    first and second elongate half-shells, each half-shell comprising an elongate thin-wall body having a substantially U-shaped cross-sectional profile with a pair of substantially straight parallel legs and a constant sideways opening along the length of the body, said half-shells having a half-shell height between the outside edges of said legs along said sideways opening; and
    a center brace having dimensions which span the length and height of the sideways openings and which height dimension is substantially equal to the half-shell height;
    wherein the sideways openings of the first and second half-shells are coupled together against the center brace to form a flattened elongate exhaust tube having an inlet end and an outlet end for directing exhaust gases from an internal combustion engine.

2. The exhaust tube system of claim 1, wherein the first and second elongate half-shells are reversible top-to-bottom and end-to-end.

3. A modular exhaust tube system for directing exhaust gases from an internal combustion engine, comprising:
    first and second elongate half-shells, each half-shell comprising an elongate thin-wall body having a substantially U-shaped cross-sectional profile with a constant sideways opening along the length of the body; and
    a center brace having dimensions which span the length and height of the sideways openings;
    wherein the sideways openings of the first and second half-shells are coupled together around the center brace to form a flattened elongate exhaust tube having an inlet end and an outlet end for directing exhaust gases from an internal combustion engine; and
    wherein the first and second elongate half-shells are selected from a group of interchangeable and modular half-shells having different substantially U-shaped cross-sectional profiles.

4. The exhaust tube system of claim 3, wherein the exhaust tube formed from any two half-shells selected from the group of interchangeable and modular half-shells has a predetermined circumference and a constant internal cross-sectional area from the inlet end to the outlet end.

5. The exhaust tube system of claim 3, wherein the different substantially U-shaped cross-sectional profiles are selected from a group consisting of a rounded-shaped profile, a rectangle-shaped profile, a trapezoid-shaped profile, a sigma-shaped profile and a peaked-shaped profile.

6. The exhaust tube system of claim 1, wherein the center brace is solid along the length thereof to restrict the exhaust gases from passing from one half-shell to the other half-shell.

7. The exhaust tube system of claim 1, wherein the center brace comprises a plurality of apertures along a length thereof for allowing the exhaust gases to pass from one half-shell to the other half-shell.

8. The exhaust tube system of claim 7, wherein the shape of the plurality of apertures is selected from the group consisting of round, NACA, oblong, triangular, polygonal, and rounded slot shapes, and combinations thereof.

9. The exhaust tube system of claim 1, further comprising each of the sideways openings having at least one inwardly-bending lip, and wherein the inwardly-bending lips of coupled half-shells join together around the center brace to form a groove for containing weld melt from a linear weld.

10. A modular exhaust tube system for directing exhaust gases from an internal combustion engine, comprising:
    first and second elongate half-shells, each half-shell comprising an elongate thin-wall body having a substantially U-shaped cross-sectional profile with a constant sideways opening along the length of the body; and
    a center brace having dimensions which span the length and height of the sideways openings;
    wherein the sideways openings of the first and second half-shells are coupled together around the center brace to form a flattened elongate exhaust tube having an inlet end and an outlet end for directing exhaust gases from an internal combustion engine; and
    further comprising a tandem flattened elongate exhaust tube positioned adjacent to but without contacting the exhaust tube for directing additional exhaust gases from the internal combustion engine.

11. The exhaust tube system of claim 1, further comprising a transition tube for coupling the inlet end of the exhaust tube system to a rounded secondary exhaust piping outlet of the internal combustion engine, said transition tube comprising:
    first and second tapered half-shells, each tapered half-shell comprising a tapered thin-wall body having a substantially U-shaped cross-sectional profile with a tapered sideways opening along the length of the body; and
    a tapered center brace having dimensions which span the length and height of the tapered sideways openings,
    wherein the tapered sideways openings of the first and second tapered half-shells are coupled together around the center brace to form an enclosed transition tube having a transition inlet shaped to match the rounded secondary exhaust piping outlet and a transition outlet shaped to match the inlet end of the elongated exhaust tube.

12. The exhaust tube system of claim 11, wherein the transition inlet shape comprises a round shape or an oval shape.

13. The exhaust tube system of claim 11, wherein the tapered center brace is separate from the center brace of the elongate exhaust tube.

14. The exhaust tube system of claim 11, wherein the tapered center brace is a continuous extension of the center brace of the elongate exhaust tube.

15. The exhaust tube system of claim 11, wherein the tapered center brace is asymmetrical having a tapered top edge and a straight bottom edge.

16. The exhaust tube system of claim 11, further comprising each of the tapered sideways openings having at least one inwardly-bending lip, and wherein the inwardly-bending lips of coupled tapered half-shells join together around the tapered center brace to form a groove for containing weld melt from a linear weld.

17. A method for making an exhaust tube for an internal combustion engine, comprising:
   obtaining a first and second elongate half-shell, each half-shell comprising an elongate thin-wall body having a substantially U-shaped cross-sectional profile with a constant sideways opening along the length of the body;
   obtaining a center brace having dimensions which span the length and height of the sideways openings, wherein the center brace is selected from a group of interchangeable and modular center braces consisting of a solid center brace and center braces having a different plurality of shaped apertures,
   aligning the sideways openings of the first and second half-shells together around the center brace; and
   coupling the half-shells and the center brace together to form a flattened elongate exhaust tube having an inlet end and an outlet end for directing exhaust gases from an internal combustion engine.

18. The method of claim 17, further comprising selecting the first and second elongate half-shells from a group of interchangeable and modular half-shells having different substantially U-shaped cross-sectional profiles.

19. The method of claim 18, wherein the different substantially U-shaped cross-sectional profiles are selected from a group consisting of a rectangle-shaped profile, an oval-shaped profile, a trapezoid-shaped profile and a sigma-shaped profile.

20. The method of claim 17, wherein the first and second elongate half-shells are reversible top-to-bottom and end-to-end.

21. The method of claim 17, wherein the different plurality of shaped apertures are selected from the group consisting of a round shape, a NACA shape, a triangular shape, a polygonal shape, an oblong shape and a slotted rectangular shape, and combinations thereof.

22. The method of claim 17, wherein coupling the first and second elongate half-shells and the center brace together further comprises welding the half-shells and the center brace together using a linear weld.

23. The method of claim 22, wherein obtaining a first and second elongate half-shells further comprises obtaining half-shells with sideways openings having at least one inwardly-bending lip, and wherein the inwardly-bending lips of the coupled half-shells join together around the center brace to form a groove for containing weld melt from the linear weld.

24. The method of claim 17, further comprising positioning a tandem flattened elongate exhaust tube adjacent to but without contacting the exhaust tube for directing additional exhaust gases from the internal combustion engine.

* * * * *